July 2, 1963
C. M. DOOLITTLE
3,095,739
SPECIFIC HEAT MEASURING DEVICE
Filed June 29, 1961
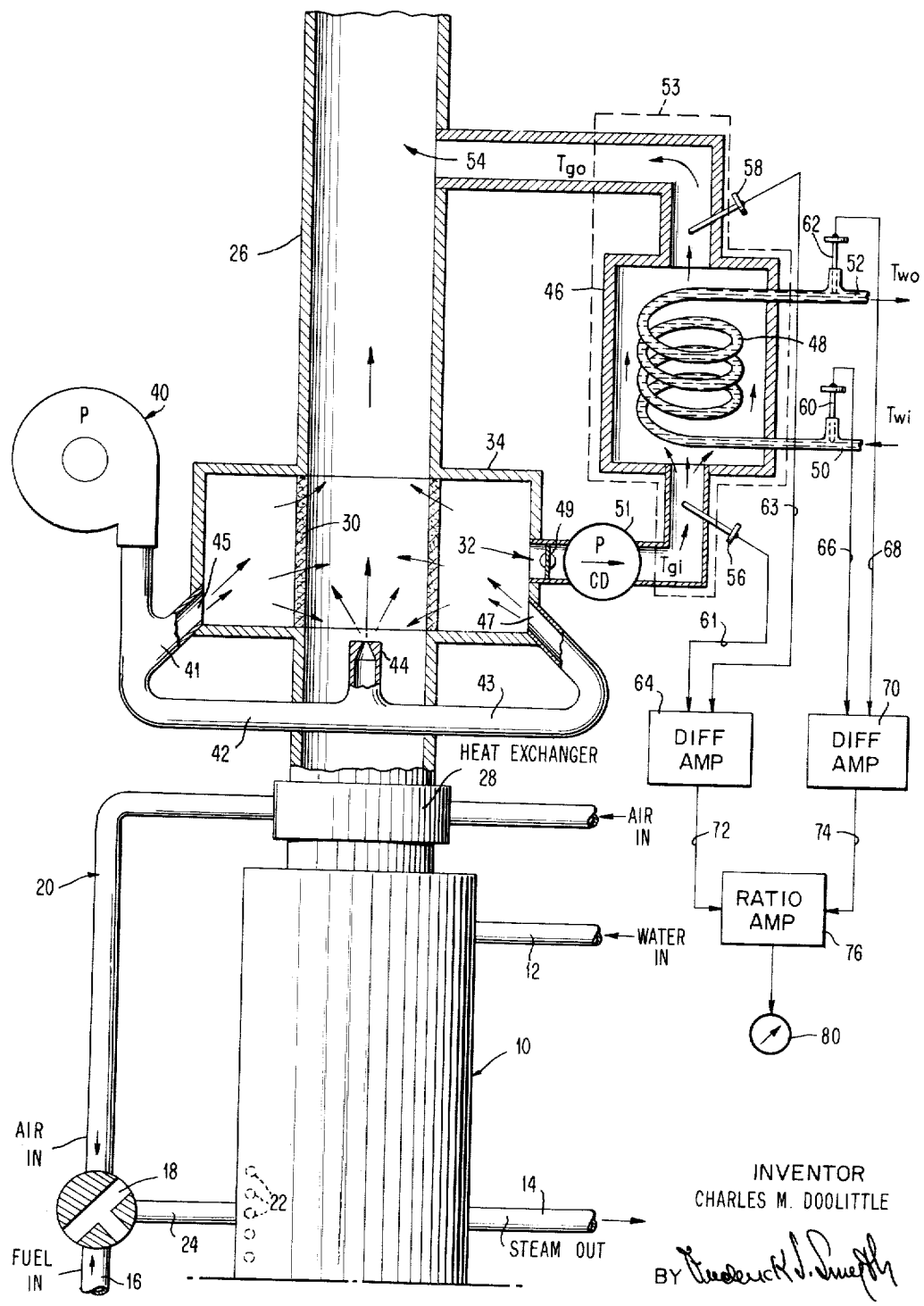
INVENTOR
CHARLES M. DOOLITTLE
BY [signature]
ATTORNEY

3,095,739
SPECIFIC HEAT MEASURING DEVICE
Charles M. Doolittle, Peekskill, N.Y., assignor to International Business Machines Corporation, New York, N.Y., a corporation of New York
Filed June 29, 1961, Ser. No. 120,586
1 Claim. (Cl. 73—190)

This invention relates to a specific heat measuring device and more particularly to an apparatus and method for measuring automatically and continuously in real time the specific heat of a fluid.

In the field of power generation it is obviously desirable that the system be operated in as efficient and economical manner as possible. To achieve these results, a large number of measuring, controlling, indicating and other devices have been incorporated in the power generating systems of the prior art to monitor selected system variables during system operation. By way of example, in a steam electric generating unit, which includes a boiler, steam turbine, and an electrical generator, the flow rates of several gases, fuels, and liquids, the temperatures at selected reference points, the power output, the fuel consummation, and the like, are monitored and controlled.

According to the present invention, there is provided means for determining the specific heat of a fluid on a continuous basis which is particularly adapted for use as a measuring instrument in power generating systems, as well as in heating plants in general. Specific heat is defined as the ratio of the thermal capacity of a substance to the thermal capacity of water, where the thermal capacity of a substance is further defined as the number of calories needed to raise one gram of it through one centigrade degree. By way of example, it has generally proved difficult to rapidly and continuously determine the specific heat of a material. A typical method of determining specific heat requires that a sample of the material of known mass be heated to a predetermined temperature. Next, a calorimeter, comprising a heat insulated metal vessel containing a known amount of water at a measured temperature is provided into which the heated sample is immersed. The resulting equilibrium temperature of the mixture is thereafter determined by equating the amount of heat released by the sample to the amount of heat gained by the water and calorimeter using the relationship:

$$Q = mct$$

where:

$Q$ = Amount of heat,
$m$ = the mass of the material
$c$ = the thermal capacity of the material, and,
$t$ = the change in temperature However, a further problem arises in determining the specific heat of a gas since the specific heat of a gas at a constant pressure exceeds the specific heat of a gas at constant volume.

According to the invention, however, there is provided both a novel method and apparatus for determining the specific heat of any fluid on a continuous basis, and moreover provides a sound, simple, and unsophisticated approach, as described in the preferred embodiment illustrating the invention, for determining the specific heat of the stack gas in a heat generating plant. . Basically, in the preferred embodiment, the apparatus provided by this invention is a stack gas to water heat exchanger, designed to minimize fouling by the stack ashes, which, together with four temperature transducers, and a generating means provides an indication of the specific heat of the stack gas automatically and continuously in real time. Preferably, the generating means is a conventional stored program computer. However, for simpler installations alternate means are provided for generating the indication. As hereinafter described in detail, the method, together with the apparatus, of the invention provides a simple and accurate method of determining the specific heat of the stack gas.

It is an object of this invention to provide a specific heat measuring device.

A further object of this invention is to provide an apparatus and method for measuring automatically and continuously in real time the specific heat of a fluid.

Another object of the invention is to provide an apparatus and method for measuring the specific heat of the stack gas in a power generating system.

Yet another object of the invention is to provide a novel method for determining the specific heat of a fluid.

Still another object of the invention is to provide a measuring device of general utility in automated power plants.

The foregoing and other objects, features and advantages of the invention will be apparent from the following more particular description of a preferred embodiment of the invention, as illustrated in the accompanying drawing.

In the drawing:

The FIGURE is an illustration partly in block and partly in schematical form showing the apparatus of the invention installed in a heat generating plant.

Referring now to the drawing, the figure illustrates, in elemental form, the apparatus of the invention installed in a heat generating plant. As shown therein, a boiler 10 is employed to convert water, supplied by means of an inlet tubing 12, into steam which is delivered by an outlet tubing 14. Fuel is transported along a conveyor 16 to a mixer valve 18 wherein it is intermixed with air provided by a channel 20, the resulting mixture thereafter delivered to a plurality of burners 22 within boiler 10 along a conduit 24. Emerging from the upper portion of boiler 10 is a stack 26 through which the flue gases are exhausted. As illustrated in the drawing, the input air prior to mixing with the fuel is first passed through a heat exchanger 28 to thereby preheat the air for improved efficiency.

As will be understood by those skilled in the art, in large scale power and heat generating plants, stack 26 represents a gas sampling line from the actual stack. Various modifications and additions may be made to the apparatus briefly described above, as is well-known, without departing from the spirit of this invention.

Concentrically positioned at an intermediate section of sampling line 26, there is shown a porous filter 30 which is effective to divert a portion of the stack gas through a bypass channel 32. As shown, the inner diameter of filter 30 is maintained equal to the inner diameter of stack 26 to maintain minimum draft losses. Filter 30 is encased within a housing 34 and is effective to divert a portion of the stack gases to the specific heat measuring device of the invention and, additionally, is effective to prevent a large portion of the stack ashes, resulting from the combustion process, from also being diverted along path 32. In furtherance of this separation of the stack gas from the ashes, a blower 40, or any source of gas or steam pressure, is provided connected to a conduit 42 which terminates in a nozzle 44 centrally positioned within sampling line 26. Additionally, blower 40 is connected by a pair of conduits 41 and 43 to a pair of openings 45 and 47 in housing 34. Each opening 45 and 47 is inclined at an upward angle to the outer surface of filter 30. In this manner, blower 40 in cooperation with nozzle 44 and openings 45 and 47, is effective to remove flue ashes, which tend to adhere to filter 30 and thereby decrease its transmission efficiency, by supplying air, steam, or any clean gas at a predetermined pressure at and through filter 30. Depending on the quantity of ashes adhering to filter 30, blower 40 is periodically operated as required. A valve 49 is provided in path 32 selectively operable in conjunction with blower 40 to prevent the gas supplied by the blower from traversing into a casing 46.

Positioned in the entrance portion of alternate path 32 is a constant flow gas pump 51 which maintains the flow rate of the stack gas through path 32 constant at a predetermined rate.

Also provided in alternate path 32 is a heat exchanger comprising casing 46 within which is secured a helical coil 48. Casing 46 is enclosed by an insulating chamber generally shown in the figure as 53. Coil 48 is supplied with inlet and outlet ports 50 and 52, respectively, to which water at a constant rate of flow is provided. Stack gas flowing along path 32 delivers heat to the water supplied to coil 48, when the water supplied thereto is at a lower temperature than the stack gas. Alternatively, the stack gas is heated by the water supplied to coil 48 when the water is at a temperature higher than the gas temperature. Thereafter, the stack gas flowing along alternate path 32 returns to stack 26 through an opening 54.

The stack gas entering casing 46 is at a temperature $T_{gi}$ and the gas leaving casing 46 is at a temperature $T_{go}$. Additionally, the water entering inlet port 50 is at a temperature $T_{wi}$ and the water leaving outlet 52 is at a temperature $T_{wo}$. Two pairs of temperature transducers, indicated generally as 56, 58, 60, and 62 are structurally incorporated to measure each of these temperatures individually during the operation of the device. The heat absorbed by the water from the stack gas, which is the general case since normally the water is at a lower temperature than the stack gas, is determined from Equation 1 below:

$$H_w = f_1 F_w C_{pw}(T_{wo} - T_{wi}) \quad (1)$$

Where:

$H_w$ is equal to the heat absorbed by the water,
$f_1$ is a calibration constant,
$F_w$ is the rate of flow of the water, a constant,
$C_{pw}$ is the specific heat of water, a known constant, and
$T_{wo}$ and $T_{wi}$ are the water temperatures as defined above.

Additionally, the heat given up by the stack gas is determined from Equation 2:

$$H_g = f_2 F_g C_{pg}(T_{gi} - T_{go}) \quad (2)$$

where:

$H_g$ is the heat given up by the stack gas,
$f_2$ is a calibration constant,
$F_g$ is the rate of flow of the stack gas, a constant,
$C_{pg}$ is the unknown specific heat of the gas, and
$T_{gi}$ and $T_{go}$ are the gas temperatures as defined above.

Since the heat absorbed by the water is equal to the heat given up by the gas, Equation 1 is equal to Equation 2. Equating these equations and solving for $C_{pg}$ the unknown specific heat of the gas, Equation 3 results.

$$C_{pg} = \frac{f_1 F_w C_{pw}(T_{wo} - T_{wi})}{f_2 F_g (T_{gi} - T_{go})} \quad (3)$$

Equation 3 can therefore be written in the following simplified form:

$$C_{pg} = \left(\frac{T_{wo} - T_{wi}}{T_{gi} - T_{go}}\right) \quad (4)$$

Where K is a constant.

Examination of Equation 4 shows that the unknown specific heat of the gas, $C_{pg}$, is equal to a constant times a function of four variables, each of which can be precisely measured by means of thermocouples, electrical sensing elements, or the like. Thus, in the operation of a power generating system or any heat generating system in general, merely supplying the stored program computer therein with the outputs of the four temperature sensing devices, the specific heat of the stack gas is generated automatically and continuously in real time. To place the device of the invention in operation it is merely necessary to provide a gas, having a known specific heat, to path 32 and calibrate constants $f_1$ and $f_2$, or, more specifically constant K of Equation 4. Thereafter, the specific heat of the stack gas is accurately determined according to the invention.

In lieu of employing a computer as the means for generating an indication of the specific heat, the further equipment illustrated in block form in the FIGURE may be used. As shown, the electrical outputs of sensing elements 56 and 58 proportional to the input and output stack gas temperatures, respectively, are coupled through a pair of leads 61 and 63 to the inputs of a first difference amplifier 64. In a similar manner, the outputs of transducers 60 and 62 are coupled through a pair of leads 66 and 68 to a second difference amplifier 70. Amplifier 64 is effective to generate the function $T_{gi} - T_{go}$ which then appears on a line 72 and amplifier 70 generates the function $T_{wo} - T_{wi}$ which then appears on a line 74. Lines 72 and 74 are then coupled to the inputs of a ratio amplifier 76. Amplifier 76, properly modified by the constant K of Equation 4 is then delivered to indicating device 80 such as a meter, recording device, etc., which thereby indicates the specific heat on a continuous basis.

It should be noted that a few precautions are necessary in the apparatus indicated in the drawing. By way of example, casing 46 must be provided with sufficient insulation as indicated as 53 to prevent heat loss therethrough. Additionally, blower 40, together with valve 49, must be intermittently operated to remove the flue ashes which tend to adhere to the surface of porous filter 30. During these purging periods, the system for determining $C_{pg}$ is, of course, inoperative.

While the invention has been particularly shown and described with reference to a preferred embodiment thereof, it will be understood by those skilled in the art that various changes in form and details may be made therein without departing from the spirit and scope of the invention.

What is claimed is:

Apparatus for determining the specific heat of the stack gas in a heat generating unit comprising; an alternate path in parallel with said stack; filter means concentrically positioned with said stack for coupling the input of said alternate path to said stack; said filter means having an inner diameter substantially equal to the inner diameter of said stack and effective to prevent the entry into said alternate path of particles resulting from combustion in said unit; means maintaining the flow rate of stack gas through said alternate path substantially constant; heat exchange means positioned in said alternate path effective to remove a portion of the heat of said stack gas; means supplying said heat exchange means with a fluid at a constant rate; said fluid having a predetermined specific heat and effective to absorb the heat removed from said stack gas; means determining the temperature decrease of said stack gas and the temperature increase of said fluid; and means responsive only to said last named means generating an indication of the specific heat of said stack gas.

References Cited in the file of this patent

UNITED STATES PATENTS

| | | |
|---|---|---|
| 987,537 | Beasley et al. | Mar. 21, 1911 |
| 1,869,585 | Schmidt | Aug. 2, 1932 |
| 2,004,194 | De Lacy-Mulhall | June 11, 1935 |
| 2,983,145 | Horn et al. | May 9, 1961 |

FOREIGN PATENTS

| | | |
|---|---|---|
| 756,380 | Great Britain | Sept. 5, 1956 |

UNITED STATES PATENT OFFICE

CERTIFICATE OF CORRECTION

Patent No. 3,095,739                          July 2, 1963

Charles M. Doolittle

It is hereby certified that error appears in the above numbered patent requiring correction and that the said Letters Patent should read as corrected below.

Column 3, lines 63 to 65, equation (4) should appear as shown below instead of as in the patent:

$$C_{pg} = K \left( \frac{T_{wo} - T_{wi}}{T_{gi} - T_{go}} \right)$$

Signed and sealed this 23rd day of June 1964.

(SEAL)
Attest:

ERNEST W. SWIDER
Attesting Officer

EDWARD J. BRENNER
Commissioner of Patents